(No Model.)

F. A. CLARK.
TOE WEIGHT FOR HORSESHOES.

No. 268,189. Patented Nov. 28, 1882.

WITNESSES.
Geo. W. Walker
Edward R. Crane

INVENTOR.
Frederic A. Clark

UNITED STATES PATENT OFFICE.

FREDERIC A. CLARK, OF PORTLAND, MAINE.

TOE-WEIGHT FOR HORSESHOES.

SPECIFICATION forming part of Letters Patent No. 268,189, dated November 28, 1882.

Application filed December 6, 1880. (No model.)

*To all whom it may concern:*

Be it known that I, FREDERIC A. CLARK, of Portland, in the county of Cumberland and State of Maine, have invented certain new and useful Improvements in Toe-Weights for Horses; and I do hereby declare that the following is a full, clear, and exact description of the invention, which will enable others skilled in the art to which it appertains to make and use the same, reference being had to the accompanying drawings, and to letters of reference marked thereon, which form a part of this specification, and in which drawings—

Figure 1:
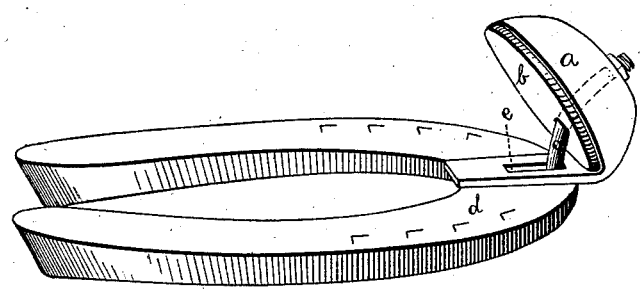
Figure 2:
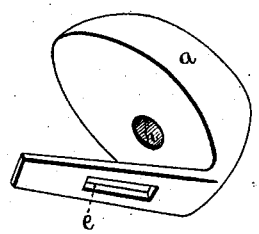
Figure 3:
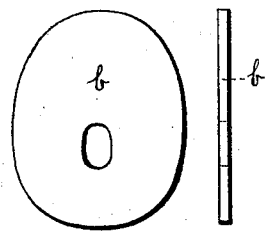
Figure 4:
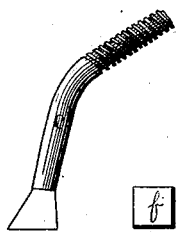

Figure 1 is a perspective view of a horseshoe with my toe-weight and extra weight or blank attached. Fig. 2 is a side view of the toe-weight without the blank. Fig. 3 is a front and side view of extra weight or blank. Fig. 4 is a front and end view of the bolt.

The object of my invention is to furnish a toe-weight which shall not be liable to become loose upon the foot of the horse when in motion, and which may be increased or diminished in weight and attached to or removed from the horse's foot without trouble.

In the drawings, $a$ is the toe-weight. $b$ is the blank or extra weight; $c$, the bolt; $d$, the horseshoe, and $e$ a slot in the shank of the toe-weight, which allows it to be moved backward and forward at will, so that a larger or smaller blank or extra weight may be inserted at pleasure, so that the weight applied to the toe may be of any desired weight without change except to increase the number or size of the blanks. The slot $e$ and hole $h$, as shown in Fig. 2, are made larger than the bolt $c$, so that the space between the hoof and the toe-weight may be increased or diminished and the bolt inserted without difficulty or any particular adjustment of the various pieces of this contrivance. The screw-bolt $c$ has a square head, which tapers toward the point, as shown in Fig. 4, $f$ and $c$, thus allowing the nut to be turned onto the bolt $c$ without turning the bolt at the same time.

It will be seen from the foregoing that when the horseshoe has been properly prepared to receive the bolt and shank of the toe-weight the shank of the toe-weight may be inserted between the horseshoe and the hoof and the bolt $c$ run through the slot $e$ and hole $h$; and should the weight be found insufficient, then it may be increased to the proper point by inserting a blank of proper size and weight.

The operation of my device is not confined to the toe, but may be applied to any other part of the hoof of a horse.

Having thus described my invention, what I claim as new, and desire to secure by Letters Patent, is—

The combination, with a horseshoe having a hole or aperture, of a weight, $a$, with the hole $h$, the shank having the slot $e$, and the bolt $c$, adapted to be passed through the shoe, the slot in the shank, and the weight, and curved, as shown, the whole being capable of adjustment in order to carry additional weight, as herein set forth.

In testimony that I claim the foregoing as my own I affix my signature in presence of two witnesses.

FREDERIC A. CLARK.

Witnesses:
 EDWARD B. CRAM,
 DENNIS A. MEAHER.